(12) United States Patent
Chueh et al.

(10) Patent No.: US 9,779,049 B2
(45) Date of Patent: Oct. 3, 2017

(54) DATA TRANSFER SYSTEM AND METHOD OF CONTROLLING THE SAME

(71) Applicant: Chant Sincere Co., Ltd., New Taipei (TW)

(72) Inventors: Yu-Chien Chueh, New Taipei (TW); Chen-An Wu, New Taipei (TW); Cheng-Hui Fan, New Taipei (TW)

(73) Assignee: CHANT SINCERE CO., LTD., New Taipei (TW)

( * ) Notice: Subject to any disclaimer, the term of this patent is extended or adjusted under 35 U.S.C. 154(b) by 194 days.

(21) Appl. No.: 14/742,867

(22) Filed: Jun. 18, 2015

(65) Prior Publication Data
US 2015/0378951 A1 Dec. 31, 2015

(30) Foreign Application Priority Data
Jun. 30, 2014 (TW) .............................. 103122441 A

(51) Int. Cl.
| | | |
|---|---|---|
| *G06F 3/00* | (2006.01) | |
| *G06F 5/00* | (2006.01) | |
| *G06F 13/14* | (2006.01) | |
| *G06F 13/20* | (2006.01) | |
| *G06F 13/00* | (2006.01) | |
| *G06F 13/40* | (2006.01) | |
| *G06F 13/38* | (2006.01) | |
| *G06F 13/42* | (2006.01) | |

(52) U.S. Cl.
CPC ........ *G06F 13/4022* (2013.01); *G06F 13/385* (2013.01); *G06F 13/4282* (2013.01)

(58) Field of Classification Search
CPC ....... H04L 12/2838; H04L 2012/40208; G06F 13/4027; G06F 11/3027; G06F 13/10; G06F 13/4022; G06F 13/4282; G06F 2213/0042
USPC ...................... 710/14, 51, 38, 305, 313, 316
See application file for complete search history.

(56) References Cited

U.S. PATENT DOCUMENTS

| | | | |
|---|---|---|---|
| 7,783,799 B1* | 8/2010 | Sivertsen | G06F 3/0227 345/156 |
| 2006/0268114 A1* | 11/2006 | Chan | H04N 1/00127 348/207.1 |
| 2007/0033308 A1* | 2/2007 | Teng | G06F 13/385 710/62 |
| 2008/0122292 A1* | 5/2008 | Minami | G06F 1/266 307/44 |
| 2009/0313510 A1* | 12/2009 | Kim | G01R 31/31715 714/712 |
| 2010/0199112 A1* | 8/2010 | Yokota | G06F 1/266 713/300 |

(Continued)

*Primary Examiner* — Faisal M Zaman
(74) *Attorney, Agent, or Firm* — Bacon & Thomas, PLLC

(57) ABSTRACT

A data transfer system is disclosed, which comprises a serial controller and a switch device. The switch device includes a first serial port, a second serial port, and a transferring unit. The first serial port and the second serial port are individually configured to transmit a first type signal to the transferring unit. The transferring unit selectively switches a transmission of the first type signal from either the first serial port or the second serial port to the serial controller. The first serial port and the second serial port are individually configured to transmit a second type signal to the serial controller, wherein the first type signal is faster than the second type signal in transmission rate.

10 Claims, 4 Drawing Sheets

(56) References Cited

U.S. PATENT DOCUMENTS

| | | | |
|---|---|---|---|
| 2012/0059965 A1* | 3/2012 | Foster | G06F 1/12 710/305 |
| 2012/0271980 A1* | 10/2012 | Hu | G06F 11/221 710/316 |
| 2015/0180254 A1* | 6/2015 | Zhao | H02J 7/0052 320/107 |
| 2015/0378951 A1* | 12/2015 | Chueh | G06F 13/4022 710/316 |

* cited by examiner

DATA TRANSFER SYSTEM AND METHOD OF CONTROLLING THE SAME

CROSS-REFERENCE TO RELATED APPLICATIONS

This application claims the benefit of the filing date under 35 U.S.C. §119(a)-(d) of Taiwan Patent Applications No. 103122441, filed Jun. 30, 2014.

BACKGROUND OF THE INVENTION

Field of the Invention

The present invention relates to a data transfer system and a method of controlling the same, and in particular to, a switch device utilized to rapid application for different transmission protocols.

Description of the Related Art

Referring to FIG. 1, a schematic diagram of a signal wiring structure of a prior data transfer system is depicted. The prior data transfer system 10 comprises a first serial port 11, a second serial port 12, a serial controller 14, and a memory card unit 15. The first serial port 11 and the second serial port 12 both can respectively transmit a first type signal 21, 22 and a second type signal 23, 24. The first type signals 21, 22 is a signal which complies with an USB (universal serial bus) 3.0 transmission protocol. The second type signals 23, 24 is a signal which complies with an USB 2.0 transmission protocol. In the prior data transfer system, when either the first serial port 11 or the second serial port 12 receives either of the first type signals 21, 22 and the second type signals 23, 24 from an interface of an electronic device of the outside to the inside. Whether the first type signals 21, 22 or the second type signals 23, 24 are directly and electrically coupled with the serial controller 14, such a direct connection will derive two major issues, the first of which is that although USB 3.0 transmission protocol has downward compatibility with the USB 2.0 transmission protocol specification, an USB 3.0-compatible component in the prior data transfer system 10 often mistakenly identifies an USB 3.0 signal as an USB 2.0 signal (as the second type signal) when the USB 3.0 input signal (as the first type signal 21, 22) is inputted into either of the first and second serial ports 11, 12 so that USB 2.0 transmission protocol is taken to treat the USB 3.0 input signal and then its transfer rate is lowered as USB 2.0; and the second of which is that the prior data transfer system 10 often fails to identify whether the first serial port 11 or the second serial port 12 is being used so that some signal errors will occur therein.

SUMMARY OF THE INVENTION

To solve the aforementioned problems in the prior art, an objective of the present invention is to provide a data transfer system with a switch device so as to ensure that the data transfer system can exactly identify and correctly process a USB 2.0 signal and/or a USB 3.0 signal received therein, and can exactly identify whether a first serial port or a second serial port thereof is being used.

To possess the above objective, the present invention provides a data transfer system which comprises a serial controller and a switch device.

The switch device comprises a first serial port, a second serial port and a transferring unit. The first serial port and the second serial port are individually configured to transmit a first type signal to the transferring unit. The transferring unit selectively switches a transmission of the first type signal from either the first serial port or the second serial port to the serial controller. The first serial port and the second serial port are individually configured to transmit a second type signal to the serial controller, wherein the first type signal is faster than the second type signal in transmission rate.

In one embodiment of the present invention, the first type signal complies with an USB 3.0 transmission protocol specification, and the first type signal is a super high speed transferring differential signal (SSTX+, SSTX−) or a super high speed receiving differential signal (SSRX+, SSRX−).

In one embodiment of the present invention, the second type signal complies with an USB 2.0 transmission protocol specification, and the second type signal is a differential signal (D+, D−).

In one embodiment of the present invention, the first serial port transmits at least one first power signal and the second serial port transmits at least one second power signal. The switch device further comprises a first switching unit and a second switching unit. The first switching unit is coupled with the at least one first power signal and determines whether to conduct a transmission of the at least one first power signal to the serial controller or not according to different potentials of the at least one second power signal, and the second switching unit is coupled with the at least one second power signal and determines whether to conduct a transmission of the at least one second power signal to the serial controller or not according to different potentials of the at least one first power signal. Furthermore, the transferring unit is selectively switched to transmit the first type signal of either the first serial port or the second serial port to the serial controller according to different potentials of the at least one first power signal.

In one embodiment of the present invention, while the first switching unit is conducted to transmit the at least one first power signal to the serial controller or the second switching unit is conducted to transmit the at least one second power signal to the serial controller, the serial controller supplies power to the transferring unit.

In one embodiment of the present invention, the first switching unit and the second switching unit are PNP transistors. A source electrode of the first switching unit is coupled with the at least one first power signal of the first serial port, a drain electrode of the first switching unit is coupled with the serial controller, and a gate electrode of the first switching unit is coupled with the at least one second power signal of the second serial port. A source electrode of the second switching unit is coupled with the at least one second power signal of the second serial port, a drain electrode of the second switching unit is coupled with the drain electrode of the first switching unit and the serial controller, and a gate electrode of the second switching unit is coupled with the at least one first power signal of the first serial port.

In one embodiment of the present invention, the first serial port and the second serial port is an USB receptacle or a micro USB receptacle, and the transferring unit is a multiplexer.

To possess the above objective, the present invention provides another data transfer system, which comprises a serial controller and a switch device.

The switch device comprises a first serial port, a second serial port, a first switching unit, and a second switching unit. The first serial port transmits at least one first power signal and the second serial port transmits at least one second power signal. The first switching unit is coupled with the at least one first power signal and determines whether to conduct a transmission of the at least one first power signal to the serial controller or not according to different potentials of the at least one second power signal, and the second switching unit is coupled with the at least one second power signal and determines whether to conduct a transmission of the at least one second power signal to the serial controller or not according to different potentials of the at least one first power signal.

In one embodiment of the present invention, the switch device further comprises a transferring unit. The first serial port and the second serial port are individually configured to transmit a first type signal to the transferring unit. The transferring unit selectively switches a transmission of the first type signal from either the first serial port or the second serial port to the serial controller. The first serial port and the second serial port are individually configured to transmit a second type signal to the serial controller, wherein the first type signal is faster than the second type signal in transmission rate.

In one embodiment of the present invention, the transferring unit selectively switches to transmit one first type signal of the first serial port or the second serial port to the serial controller according to different potentials of at least one first power signal.

In one embodiment of the present invention, the first type signal complies with an USB 3.0 transmission protocol specification, and the first type signal is a super high speed transmitting differential signal (SSTX+, SSTX−) or a super high speed receiving differential signal (SSRX+, SSRX−).

In one embodiment of the present invention, the second type signal complies with an USB 2.0 transmission protocol specification, and the second type signal is a differential signal (D+, D−).

In one embodiment of the present invention, the first switching unit and the second switching unit are PNP transistors. A source electrode of the first switching unit couples with the at least one first power signal of the first serial port, a drain electrode of the first switching unit is coupled with the serial controller, and a gate electrode of the first switching unit is coupled with the at least one second power signal of the second serial port. A source electrode of the second switching unit is coupled with the at least one second power signal of the second serial port, a drain electrode of the second switching unit is coupled with the drain electrode of the first switching unit and the serial controller, and a gate electrode of the second switching unit is coupled with the at least one first power signal of the first serial port.

In order to solve the problems given above, the present invention provides a method of controlling a data transfer system. The data transfer system comprises a first serial port, a second serial port, a transferring unit, a serial controller, a first switching unit, and a second switching unit. The first serial port transmits at least one first power signal and the second serial port transmits at least one second power signal. The controlling method comprises the following steps of:

While the first serial port transmits at least one first power signal to the first switching unit, determining whether to conduct a transmission of the at least one first power signal from the first switching unit to the serial controller or not according to different potentials of the at least one second power signal;

While the second serial port transmits at least one second power signal to the second switching unit, determining whether to conduct a transmission of the at least one second power signal from the second switching unit to the serial controller or not according to different potentials of the at least one first power signal; and Selectively switching the transferring unit to transmit the first type signal of either the first serial port or the second serial port to the serial controller according to the different potentials of the at least one first power signal.

In one embodiment of the present invention, while the at least one first power signal and the at least one second power signal both have high potentials, the first switching unit and the second switching unit both turn off the transmission of either of the at least one first power signal and the at least one second power signal to the serial controller.

Compared with the prior art, the present invention can ensure that the data transfer system exactly identify and then correctly process a USB 2.0 signal and/or a USB 3.0 signal received therein, and ensure that the data transfer system also exactly identify whether either a first serial port or a second serial port thereof is being activated.

DETAILED DESCRIPTION OF THE EMBODIMENT(S)

Figure 1:
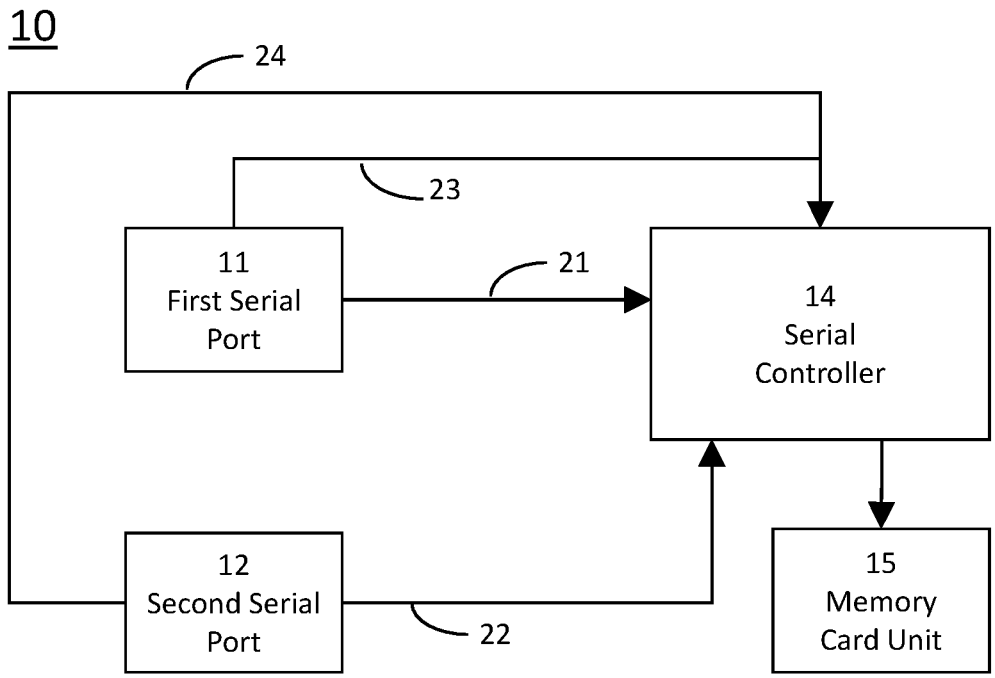
FIG. 1 depicts a schematic diagram of a signal wiring deployment in a prior data transfer system.

The following description of embodiments, with reference to the accompanying drawings, is used to exemplify a specific embodiment which may be carried out in the present invention. Directional terms mentioned in the present invention, such as "top", "bottom", "front", "back", "left", "right", "inside", "outside", "side", etc., are only used with reference to the orientation of the accompanying drawings. Therefore, the used directional terms are intended to illustrate, but not to limit, the present invention. In the drawings, components having similar structures are denoted by the same numerals.

Firstly referring to FIG. 2, a schematic diagram of a signal wiring deployment of a data transfer system 100 according to the present invention is introduced hereinafter, which comprises a serial controller 140, a switch device 170, and a memory card unit 150. The switch device 170 comprises a first serial port 110, a second serial port 120 and a transferring unit 130.

Each of the first serial port 110 and the second serial port 120 is used to respectively receive a first type signal 111, 112 or a second type signal 113, 114 from an external electronic equipment (such as a computer, digital camera, digital TV, mobile phone or pad, etc.). In the preferred embodiment of the present invention, each of the first serial port 110 and the second serial port 120 complies with an USB 3.0 transmission protocol specification, and the first type signals 111, 112 comply with an USB 3.0 transmission protocol specification, either. For example, the first type signals 111, 112 are a super high speed transferring a differential signal (SSTX+, SSTX−) or a super high speed receiving differential signal (SSRX+, SSRX−). The second type signals 113, 114 comply with an USB 2.0 transmission protocol specification. For example, the second type signals are a differential signal (D+, D−). Thus, the first type signals 111, 112 are faster than the second type signals 113, 114 in transmission rate. However, in another preferred embodiment of the present invention, each of the first serial port 110 and the second serial port 120, associated with the first type signals 111, 112 and the second type signals 113, 114 transmitted therefrom, can comply with different transmission protocols such as SATA, e-PCI, etc. In application, the first serial port 110 and the second serial port 120 can be USB receptacles, micro-USB receptacles or other types of connectors used as different connectors.

Figure 2:
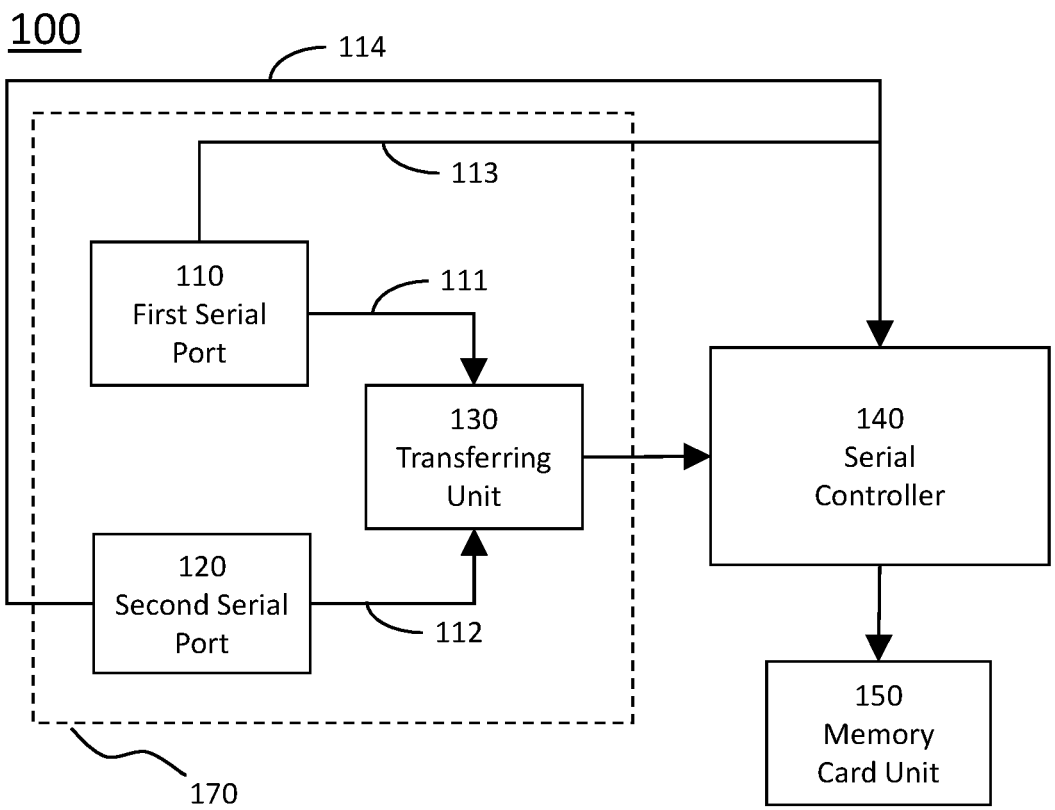
FIG. 2 depicts a schematic diagram of a signal wiring deployment of a data transfer system according to the present invention.

To make the data transfer system 100 exactly identifying and correctly processing a USB 2.0 signal and/or a USB 3.0 signal received therein, as shown in FIG. 2, the first serial port 110 and the second serial port 120 are individually configured to transmit a first type signal 111, 112 to the transferring unit 130 by the switch device 170. The transferring unit 130 selectively switches a transmission of the first type signal 111, 112 from either the first serial port 110 or the second serial port 120 to the serial controller 140. In the embodiment, the transferring unit 130 is realized as a multiplexer. Furthermore, the first serial port 110 and the second serial port 120 are individually configured to directly transmit a second type signal 113, 114 to the serial controller. In the present invention, the transferring unit 130 can ensure that the first type signal 111, 112 and the second type signal 113, 114 are exactly identified and correctly processed. Then, with connection between the serial controller 140 and the memory card unit 150, the serial controller 140 can access the data of the memory card unit 150 according to the first type signals 111, 112 and/or the second type signals 113, 114. The memory card unit 150 can be any specification, such as SD, Flash, MS, etc.

Figure 3:
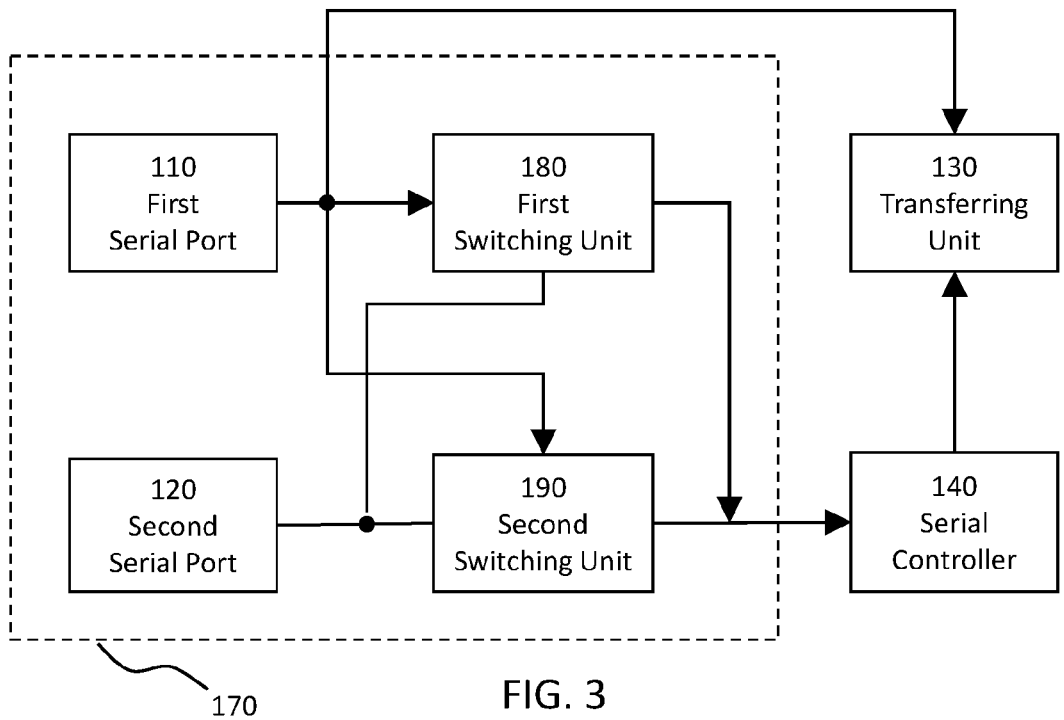
FIG. 3 depicts a schematic active diagram of a power wiring deployment according to a preferred embodiment of the present invention.

FIG. 3 depicts a schematic active diagram of a power wiring deployment according to a preferred embodiment of the present invention (a line with an arrow indicates the transmission direction of a power or high potential, and a line without arrow indicates no power or low potential). The switch device 170 further comprises a first switching unit 180 and a second switching unit 190. In the preferred embodiment of the present invention, the first switching unit 180 and the second switching unit 190 are PNP transistors. A source electrode of the first switching unit 180 is coupled with the at least one first power signal of the first serial port 110, a drain electrode of the first switching unit 180 is coupled with the serial controller 140, and a gate electrode of the first switching unit 180 is coupled with the at least one second power signal of the second serial port 190. A source electrode of the second switching unit 190 is coupled with the at least one second power signal of the second serial port 120, a drain electrode of the second switching unit 190 is coupled with the drain electrode of the first switching unit 180 and the serial controller 140, and a gate electrode of the second switching unit 190 is coupled with the at least one first power signal of the first serial port 110, wherein a low potential of the first power signal will turn on electrical conduction of the first switching unit 180, and a low potential of the second power signal will turn on electrical conductions of the second switching unit 190. However, a high potential of either of the power signals will turn off electrical conductions of the first switching unit 180 and the second switching unit 190. In another embodiment, the first switching unit 180 and the second switching unit 190 can be NPN transistors in which wirings coupled with the gate electrodes are made different from that of the preferred embodiment mentioned above. This is because a high potential of either of the power signals will turn on electrical conductions of the first switching unit 180 and the second switching unit 190, and a low potential thereof will turn off electrical conductions of the first switching unit 180 and the second switching unit 190. Thus, the present invention can ensure that the data transfer system exactly identify whether either the first serial port 110 or the second serial port 120 is being used.

With a power actuation illustrated in FIG. 3, the first serial port 110 transmits the at least one first power signal with a high potential (e.g. 5V) (indicative of actual electrical connection of the first serial port 110 with the external electronic equipment), and the second serial port 120 transmits the at least one second power signal with a low potential (e.g. 0V) (indicative of no electrical connection of the second serial port 120 with the external electronic equipment), so that the first switching unit 180 is conducted to transmit the at least one first power signal to the serial controller 140 when the gate electrode of the first switching unit 180 receives the at least one second power signal with the low potential (0V). At the same time, the second switching unit 190 does not conduct a transmission of the at least one second power signal to the serial controller 140 when the gate electrode of the second switching unit 190 receives the at least one first power signal with the high potential (5V). The serial controller 140 will supply a power to the switching unit 130 according to the at least one first power signal. The first serial port 110 will directly supply the at least one first power signal with the high potential (5V) to trigger the transferring unit 130 to selectively conduct a transmission of the first type signal 111 from the first serial port 110 to the serial controller 140, making the serial controller 140 to access the data of the memory card unit 150.

Figure 4:
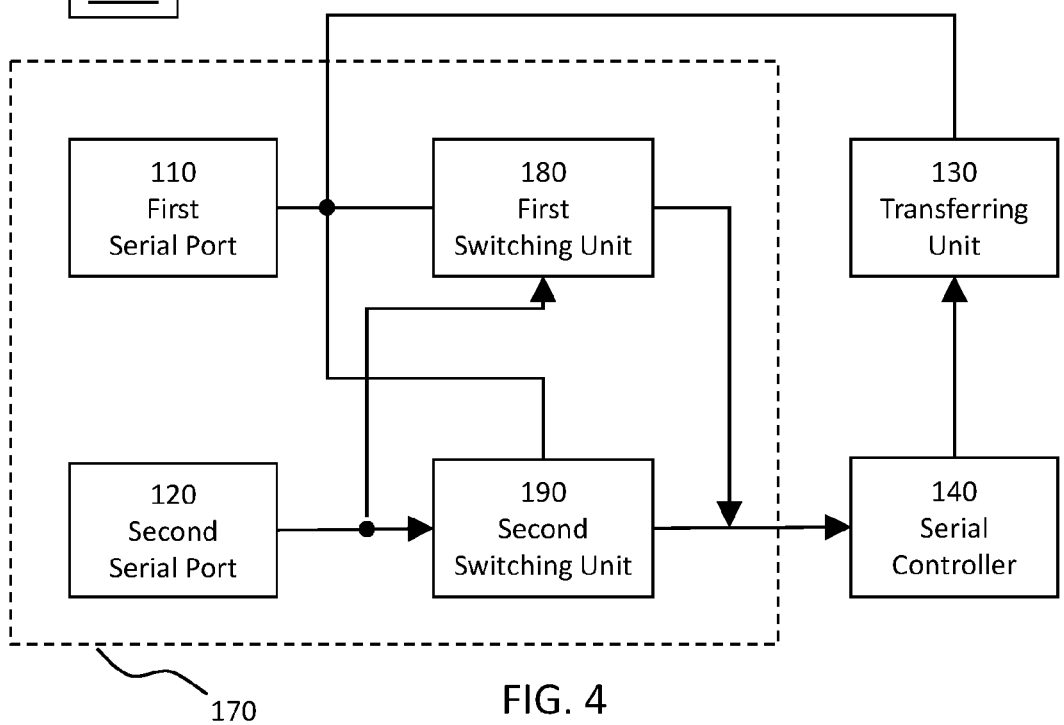
FIG. 4 depicts another schematic active diagram of the power wiring deployment according to the preferred embodiment of the present invention.

FIG. 4 depicts another schematic active diagram of a power wiring deployment according to the preferred embodiment of the present invention. The power actuation differences between illustrations of FIG. 3 and FIG. 4 are that: the first serial port 110 transmits the at least one first power signal with a low potential (0V) (indicative of no electrical connection of the first serial port 110 with the external electronic equipment) and the second serial port 120 transmits the at least one second power signal with a high potential (5V) (indicative of actual electrical connection of the second serial port 120 with the external electronic equipment), so that the second switching unit 190 is conducted to transmit the at least one second power signal to the serial controller 140 when the gate electrode of the second switching unit 190 receives the at least one first power signal with the low potential (0V). At the same time, the first switching unit 180 does not conduct a transmission of the at least one first power signal to the serial controller 140 when the gate electrode of the first switching unit 180 receives the at least one second power signal with the high potential (5V). The serial controller 140 will supply a power to the transferring unit 130 according to the at least one first power signal. The first serial port 110 will directly supply the at least one first power signal with the low potential (0V) to trigger the transferring unit 130 to selectively conduct a transmission of the first type signal 112 from the second serial port 120 to the serial controller 140, making the serial controller 140 access the data of the memory card unit 150.

Figure 5:
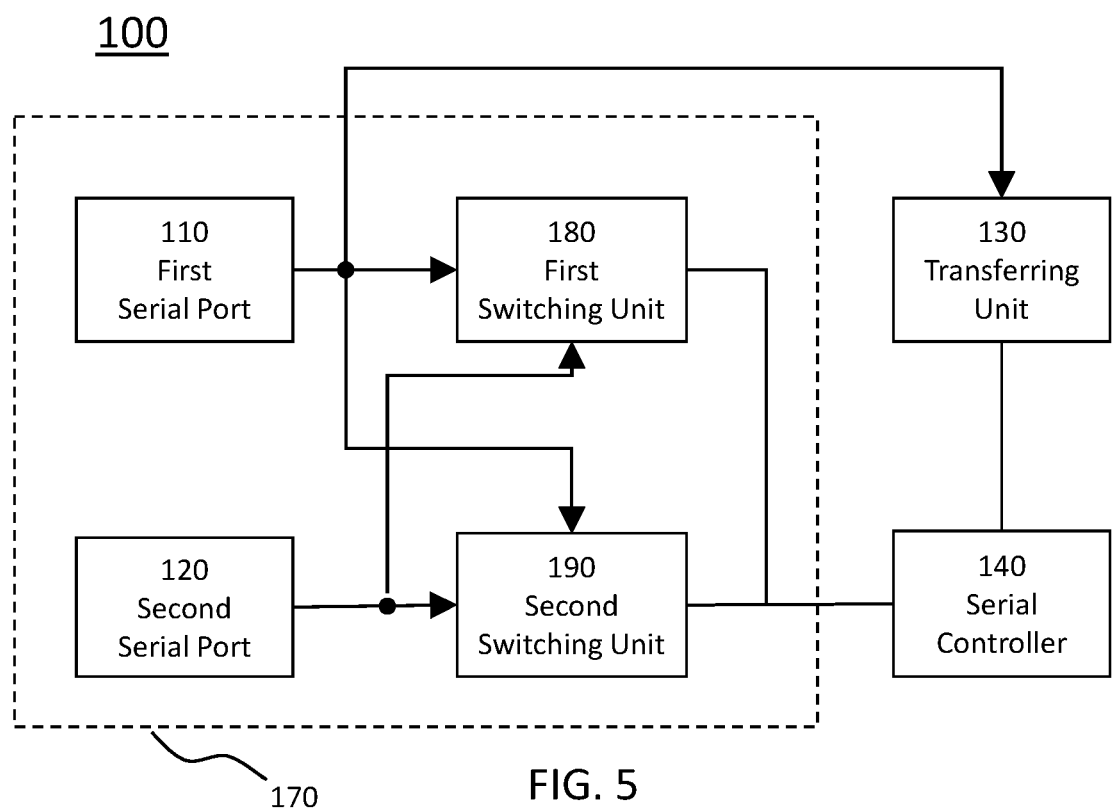
FIG. 5 depicts another schematic active diagram of the power wiring deployment of a preferred embodiment of the present invention.

FIG. 5 depicts another schematic active diagram of the power wiring deployment of a preferred embodiment of the present invention. The power actuation difference between illustrations of FIG. 5 and FIG. 4 are that: besides the second serial port 120 transmits the at least one second power signal with a high potential (5V) (indicative of actual electrical connection of the second serial port 120 with the external electronic equipment), the first serial port 110 transmits the at least one first power signal with a high potential (5V) (indicative of actual electrical connection of the first serial port 110 with the external electronic equipment). However, the first switching unit 180 and the second switching unit 190 are both PNP transistors, the high potentials of the first power signal and the second power signal make the first switching unit 180 and the second switching unit 190 turn off. Thus, there is no transmission of a power to be transmitted to the serial controller 140, which means that the serial controller 140 can't supply power to the transferring unit 130 for the switch operation, and keep the data transfer system safe.

Figure 6:
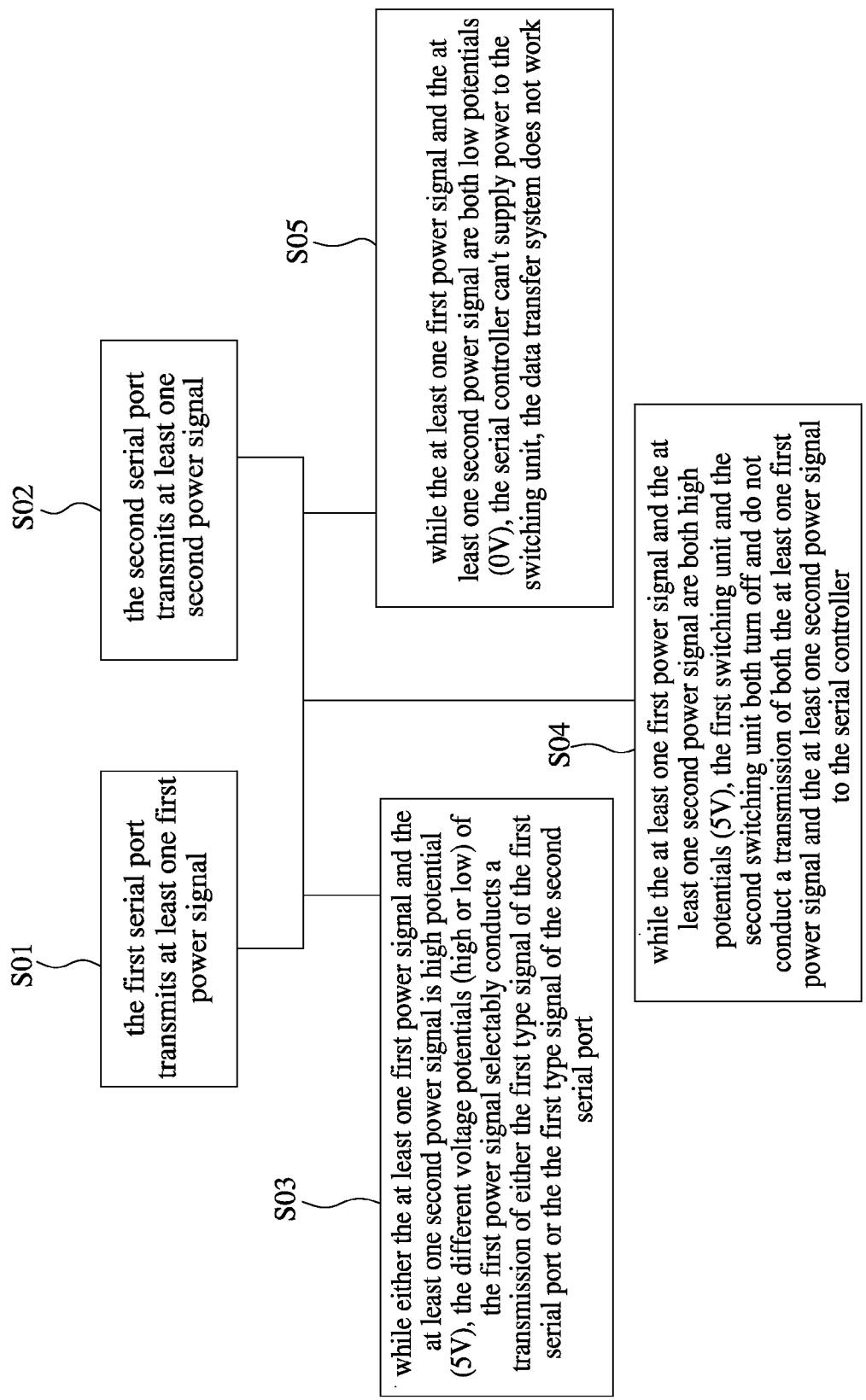
FIG. 6 depicts a flow diagram of a method of controlling the data transfer system according to the present invention.

FIG. 6 depicts a flow diagram of a method of controlling the data transfer system according to the present invention. Also, please refer to the label of units as mentioned in FIGS. 2-5. The controlling method comprises the following steps of:

In S01, while the first serial port 110 transmits the at least one first power signal to the first switching unit 180, the first switching unit 180 conducts a transmission of the at least one first power signal to the at least one first power signal to the serial controller 140 or not according to different potentials of the at least one second power signal.

In S02, while the second serial port 120 transmits the at least one second power signal to the second switching unit 190, the second switching unit 190 conducts a transmission of the at least one second power signal to the at least one first power signal to the serial controller 140 or not according to the different potentials of the at least one first power signal.

Especially, the steps S01 and S02 may be performed at the same time or not, or only one of the steps S01 and S02 is performed. May be the step S01 first and then the step S02 or the step S02 first and then the step S01 are performed in turns. Hence, according to the different potentials of the at least one first power signal and the at least one second power signal in the steps S01 and S02, the corresponding steps S03-S05 are described below.

In S03, while either the at least one first power signal and the at least one second power signal is a high potential (5V), the transferring unit 130 selectively conducts a transmission of either the first type signal 111 of the first serial port 110 or the first type signal 112 of the second serial port 120 according to the different potentials (high or low) of the first power signal. For example, the first serial port 110 transmits the at least one first power signal with a high potential (5V) and the second serial port 120 transmits the at least one second power signal with a low potential (0V), so the first switching unit 180 conducts a transmission of the at least one first power signal to the serial controller 140 by the at least one second power signal with the low potential (0V), and the serial controller 140 will supply power to the transferring unit 130 according to the at least one first power signal. At the same time, the second switching unit 190 does not conduct a transmission of the at least one second power signal to the serial controller 140 by the at least one first power signal with the high potential (5V), the first serial port 110 will directly supply the at least one first power signal with the high potential (5V) to trigger the transferring unit 130 to conduct a transmission of the first type signal 111 of the first serial port 110 to the serial controller 140, as shown in FIG. 2. Alternatively, while the at least one first power signal is a low potential (0V) and the at least one second power signal is a high potential (5V), so the first switching unit 180 does not conduct a transmission of the at least one first power signal of the first serial port 110 to the serial controller 140. At the same time, the second switching unit 190 conducts a transmission of the at least one second power signal of the second serial port 120 to the serial controller 140, and the transferring unit 130 conducts a transmission of the first type signal 112 of the second serial port 120 to the serial controller 140.

In S04, while the at least one first power signal and the at least one second power signal both are high potentials (5V), the first switching unit 180 and the second switching unit 190 both turn off and do not conduct a transmission of either the at least one first power signal and the at least one second power signal to the serial controller 140. For example, while the at least one first power signal and the at least one second power signal are both high potentials (5V), the first switching unit 180 is turned off by the at least one second power signal (5V), and the second switching unit 190 is turned off by the at least one first power signal (5V). While the first switching unit 180 and the second unit 190 are both turned off, no transmission of the first power signal of the first serial port 110 and the second power signal of the second serial port 120 to the transferring unit 130 and the serial controller 140 will be conducted for keeping the data transfer system safe.

In S05, while the at least one first power signal and the at least one second power signal both are low potentials (0V), the serial controller 140 cannot any supply power to the transferring unit 130, so that the data transfer system does not work.

While the invention has been described in terms of various specific embodiments, those skilled in the art will recognize that the invention can be practiced with modification within the spirit and scope of the claims.

What is claimed is:

1. A data transfer system, comprising:
   a serial controller; and
   a switch device comprising a first serial port, a second serial port and a transferring unit, wherein the first serial port and the second serial port are individually configured to transmit a first type signal to the transferring unit, and the transferring unit selectively switches a transmission of the first type signal from either the first serial port or the second serial port to the serial controller, and the first serial port and the second serial port are individually configured to transmit a second type signal to the serial controller, wherein the first type signal is faster than the second type signal in transmission rate;
   wherein the first serial port transmits at least one first power signal and the second serial port transmits at least one second power signal, and the switch device further comprises a first switching unit and a second switching unit, the first switching unit is coupled with the at least one first power signal and determines whether to conduct a transmission of the at least one first power signal to the serial controller or not according to different potentials of the at least one second power signal, and the second switching unit is coupled with the at least one second power signal and determines whether to conduct a transmission of the at least one second power signal to the serial controller or not according to different potentials of the at least one first power signal, the transferring unit is selectively switched to transmit the first type signal of either the first serial port or the second serial port to the serial controller according to different potentials of the at least one first power signal.

2. The data transfer system according to claim 1, wherein the first type signal complies with an USB 3.0 transmission protocol specification, and the first type signal is a super high speed transferring differential signal (SSTX+, SSTX−) or a super high speed receiving differential signal (SSRX+, SSRX−).

3. The data transfer system according to claim 1, wherein the second type signal complies with an USB 2.0 transmission protocol specification, and the second type signal is a differential signal (D+, D−).

4. A data transfer system comprising:
a serial controller; and
a switch device comprising a first serial port, a second serial port, a first switching unit and a second switching unit, wherein the first serial port transmits at least one first power signal and the second serial port transmits at least one second power signal, the first switching unit is coupled with the at least one first power signal and determines whether to conduct a transmission of the at least one first power signal to the serial controller or not according to different potentials of the at least one second power signal, and the second switching unit is coupled with the at least one second power signal and determines whether to conduct a transmission of the at least one second power signal to the serial controller or not according to different potentials of the at least one first power signal.

5. The data transfer system according to claim 4, wherein the switch device further comprises a transferring unit, wherein the first serial port and the second serial port are individually configured to transmit a first type signal to the transferring unit, the transferring unit selectively switches a transmission of the first type signal from either the first serial port or the second serial port to the serial controller, and the first serial port and the second serial port are individually configured to transmit a second type signal to the serial controller, wherein the first type signal is faster than the second type signal in transmission rate.

6. The data transfer system according to claim 5, wherein the transferring unit selectively switches to transmit one first type signal of the first serial port or the second serial port to the serial controller according to different potentials of the at least one first power signal.

7. The data transfer system according to claim 5, wherein the first type signal complies with an USB 3.0 transmission protocol specification, and the first type signal is a super high speed transmitting differential signal (SSTX+, SSTX−) or a super high speed receiving differential signal (SSRX+, SSRX−).

8. The data transfer system according to claim 7, wherein the second type signal complies with an USB 2.0 transmission protocol specification, and the second type signal is a differential signal (D+, D−).

9. A controlling method for a data transfer system, the data transfer system comprising a first serial port, a second serial port, a transferring unit, a serial controller, a first switching unit and a second switching unit wherein the first serial port transmits at least one first power signal and the second serial port transmits at least one second power signal, the controlling method comprising the following step of:

determining whether to conduct a transmission of the at least one first power signal from the first switching unit to the serial controller or not according to different potentials of the at least one second power signal, while the first serial port transmits at least one first power signal to the first switching unit;

determining whether to conduct a transmission of the at least one second power signal from the second switching unit to the serial controller or not according to different potentials of the at least one first power signal, while the second serial port transmits at least one second power signal to the second switching unit; and selectively switching the transferring unit to transmit the first type signal of either the first serial port or the second serial port to the serial controller according to the different potentials of the at least one first power signal.

10. The controlling method according to claim 9, further comprising:

turning off the first switching unit and the second switching unit to not transmit the at least one first power signal and the at least one second power signal to the serial controller while the at least one first power signal and the at least one second power signal both have high potentials.

* * * * *